(12) United States Patent　　(10) Patent No.: US 7,529,876 B2
Norgaard　　(45) Date of Patent: May 5, 2009

(54) TAG ALLOCATION METHOD

(75) Inventor: David A. Norgaard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 11/348,878

(22) Filed: Feb. 7, 2006

(65) Prior Publication Data

US 2007/0198756 A1　Aug. 23, 2007

(51) Int. Cl.
*G06F 13/24* (2006.01)

(52) U.S. Cl. .................. 710/263; 710/260; 710/310

(58) Field of Classification Search ......... 710/305–306, 710/112, 260–269, 310; 711/151, 137
See application file for complete search history.

(56) References Cited

U.S. PATENT DOCUMENTS

| | | | | |
|---|---|---|---|---|
| 5,778,434 A | * | 7/1998 | Nguyen et al. | 711/137 |
| 5,906,000 A | * | 5/1999 | Abe et al. | 711/151 |
| 6,832,279 B1 | * | 12/2004 | Potter et al. | 710/112 |
| 7,124,231 B1 | * | 10/2006 | Garner et al. | 710/310 |

* cited by examiner

*Primary Examiner*—Clifford H Knoll
*Assistant Examiner*—Kim T Huynh
(74) *Attorney, Agent, or Firm*—Patterson & Associates (57) ABSTRACT

Embodiments of the present invention provide methods and systems for allocating multiple tags to multiple requesters in back to back clock cycles. A tag pool may be divided into a predetermined number of sections. Each requester may be associated with at least one of the sections in the tag pool. When multiple tag requests are received from multiple requesters each section containing available tags may provide a tag to a requester associated with the section per clock cycle. Therefore, multiple tags may be provided to multiple requesters in back to back clock cycles, thereby increasing efficiency and improving performance.

4 Claims, 6 Drawing Sheets

TAG ALLOCATION METHOD

BACKGROUND OF THE INVENTION

1. Field of the Invention

The present invention generally relates to command processing. More specifically the invention relates to allocating multiple tags from a tag pool to multiple requesters in back to back clock cycles.

2. Description of the Related Art

Computing systems generally include one or more central processing units (CPUs) communicably coupled to memory and input/output (IO) devices. The memory may be random access memory (RAM) containing one or more programs and data necessary for the computations performed by the computer. For example, the memory may contain a program for encrypting data along with the data to be encrypted. The IO devices may include video cards, sound cards, graphics processing units, and the like configured to issue commands and receive responses from the CPU.

The CPU may interpret and execute one or more commands received from the memory or IO devices. The commands received by the CPU may come from different IO devices and on different virtual channels. For example, a processor may receive commands to access memory from an IO device. The commands may be received serially over an interconnect bus and placed in an input buffer at the CPU. The commands in the buffer may be accessed in a pipelined manner for processing. For example, some commands such as read and write commands may have an address associated with the command. The addresses associated with the commands may be virtual address. Therefore, processing commands may involve accessing page and segment tables in cache to translate virtual addresses to physical addresses. After processing, the commands may be dispatched to the CPU for execution.

One problem is that a CPU may receive more commands than it can process at a given time. Therefore, due to the limited resources at the CPU some type of flow control is needed to limit the number of commands dispatched for execution, based on available resources. One solution to this problem is to implement a tag allocation scheme. A predetermined number of tags in a tag pool may be available based on the CPU resources. A command in the input buffer may request a tag from the tag pool. If a tag is available, indicating that processing resources are available, the command may be allocated a tag and be sent down the pipeline for processing and execution. If no tags are available, the command may wait until a tag in the tag pool frees up. After a command has been processed, the tags may be freed up and made available to other commands in the input buffer.

One problem with this solution is that tags from the tag pool are provided serially. For example, in each clock cycle the tag pool may receive a tag request and provide a tag to the requester. However, in some cases, multiple requesters may need a tag in a given clock cycle. Because only one tag may be provided from the tag pool per clock cycle, a bottleneck that adversely affects performance may be created during tag allocation.

Therefore, what is needed are methods and systems for allowing multiple requesters to receive multiple tags in each clock cycle.

SUMMARY OF THE INVENTION

The present invention generally relates to allocating multiple tags from a tag pool to multiple requesters in back to back clock cycles.

One embodiment of the invention provides a method for allocating tags from a tag pool to multiple requesters. The method generally comprises receiving requests for tags from multiple requesters, wherein each of the multiple requesters are associated with an available section from a predetermined number of sections of the tag pool, an available section comprising at least one available tag, and for each available section, assigning a predetermined tag from the section to a requester associated with the section.

Another embodiment of the invention provides a microprocessor for allocating tags to commands. The microprocessor generally comprises (i) a command queue configured to store a sequence of commands received from the one or more input/output devices, wherein each command is associated with a requester for tag allocation, (ii) a tag pool comprising a predetermined number of sections, each section comprising a plurality of tags, and (iii) tag allocation logic configured to receive tag requests from multiple requesters, wherein each of the requesters is associated with a section containing at least one available tag, and for each section with at least one available tag, assign a tag from the section to a requester associated with the section.

Yet another embodiment of the invention provides a system for allocating tags to commands. The system generally comprises of one or more input/output devices and a processor. The processor may generally comprise of (i) a command queue configured to store a sequence of commands received from the one or more input/output devices, wherein each command is associated with a requester for tag allocation, (ii) a tag pool comprising a predetermined number of sections, each section comprising a plurality of tags; and (iii) tag allocation logic configured to receive tag requests from multiple requesters, wherein each of the requesters is associated with a section containing at least one available tag, and for each section with at least one available tag, assign a tag from the section to a requester associated with the section.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention provide methods and systems for allocating tags to multiple requesters in back to back clock cycles. A tag pool may be divided into a predetermined number of sections. Each requester may be associated with at least one of the sections in the tag pool. When multiple tag requests are received from multiple requesters each section containing available tags may provide a tag to a requester associated with the section per clock cycle. Therefore, multiple tags may be provided to multiple requesters in back to back clock cycles, thereby increasing efficiency and improving performance.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

An Exemplary System

Figure 1:
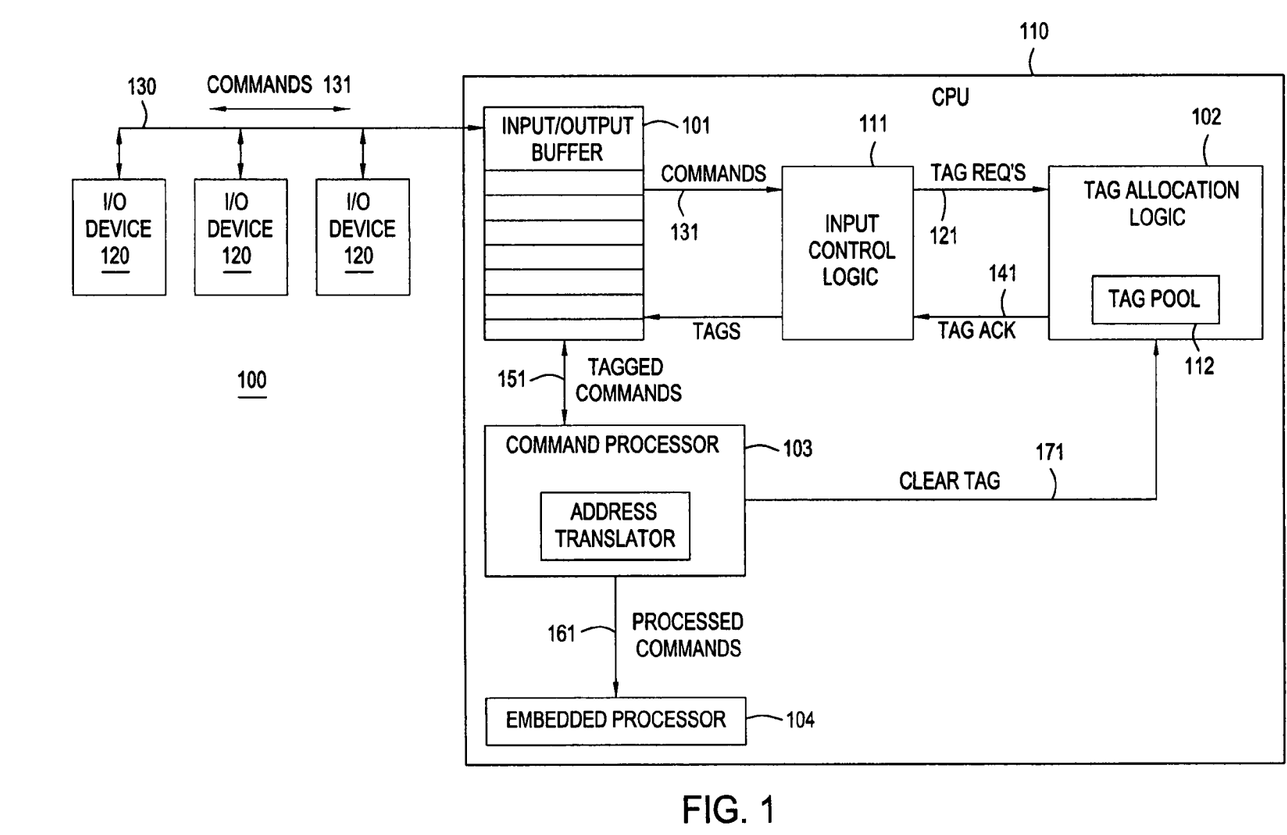
FIG. 1 is an illustration of an exemplary system according to an embodiment of the invention.

FIG. 1 illustrates an exemplary system 100 in which embodiments of the present invention may be implemented. System 100 may include a central processing unit (CPU) 110 communicably coupled to input/output (IO) devices 120. For example, CPU 110 may be coupled to IO devices 120 (as an illustration, three IO devices are shown in FIG. 1) by means of a bus 130. IO devices 120 may be configured to exchange commands and data with CPU 110, for example, through commands 131, as illustrated. Exemplary IO devices include graphics processing units, video cards, sound cards, and the like.

CPU 110 may include an input/output buffer 101, input control logic 111, tag allocation logic 102, command processor 103 and an embedded processor 104. Input/output buffer 101 may be configured to store commands 131 exchanged between the CPU and IO devices 120. For example, input/output buffer 101 may receive commands 131 serially over bus 130 and store the commands in the order in which they were received.

Input control logic 111 may control how commands 131 from input/output buffer 101 are dispatched for execution. For example, input control logic 111 may request tags for the requesting commands by asserting tag requests 121 to tag allocation logic 102. If a tag is available, the input control logic may receive a tag acknowledge signal 141. Tag acknowledge signal 141 may include an indication of tag numbers for the requesting commands. The Commands receiving tags ("tagged commands 151") may then be exchanged in a pipelined manner with command processor 103.

Tag allocation logic 102 may receive the multiple tag requests from the input control logic 111. In response to receiving the tag requests, tag allocation logic 102 may provide one or more available tags from tag pool 112 to one or more requesters. For example, tag allocation logic 102 may assert tag acknowledge signal 141 to the input control logic 111 containing tag numbers for one or more requesters.

Each requester for tags may be associated with particular commands in input/output buffer 101 having one or more common characteristics. For example, requesters may include read commands and write commands. However, one skilled in the art will recognize that any reasonable means for classifying requesters may be used.

Command processor 103 may receive tagged commands 151 from input/output buffer 101 and process the commands before dispatching the commands to processor 104. Command processing, for example, may involve determining whether a command requires address translation. For example, read and write commands may be associated with an address for the location of the read/write operation. The address associated with the read and write commands may be a virtual address. Command processing, therefore, may involve translating the virtual address to a physical address by accessing page and segment tables in cache. If an address translation entry is not found in cache (i.e. cache miss), the entry may be retrieved from memory.

In any case, processed commands 161 may be reordered and dispatched to the embedded processor 104 for execution. After each command is dispatched, command processor 103 may assert a command complete (clear), for example, by sending a clear tag signal 171 to the tag allocation logic. The clear tag signal(s) may contain the tag number allocated to an executed command. In response to receiving the clear tag signal, the tag allocation logic may clear the tag number, thereby making the tag number available for allocation to a command in input/output buffer 101.

Tag Allocation

Embodiments of the present invention lie in tag allocation logic 102. As described above, tag allocation logic 102 may receive multiple tag requests from input control logic 111 in a given clock cycle. Therefore, servicing multiple requesters in the clock cycle may be necessary to avoid performance bottlenecks. The present invention provides mechanisms for dividing a tag pool into one or more sections, wherein each section may provide a tag per clock cycle. Therefore, multiple requesters may receive a tag in a given clock cycle.

Figure 2A:
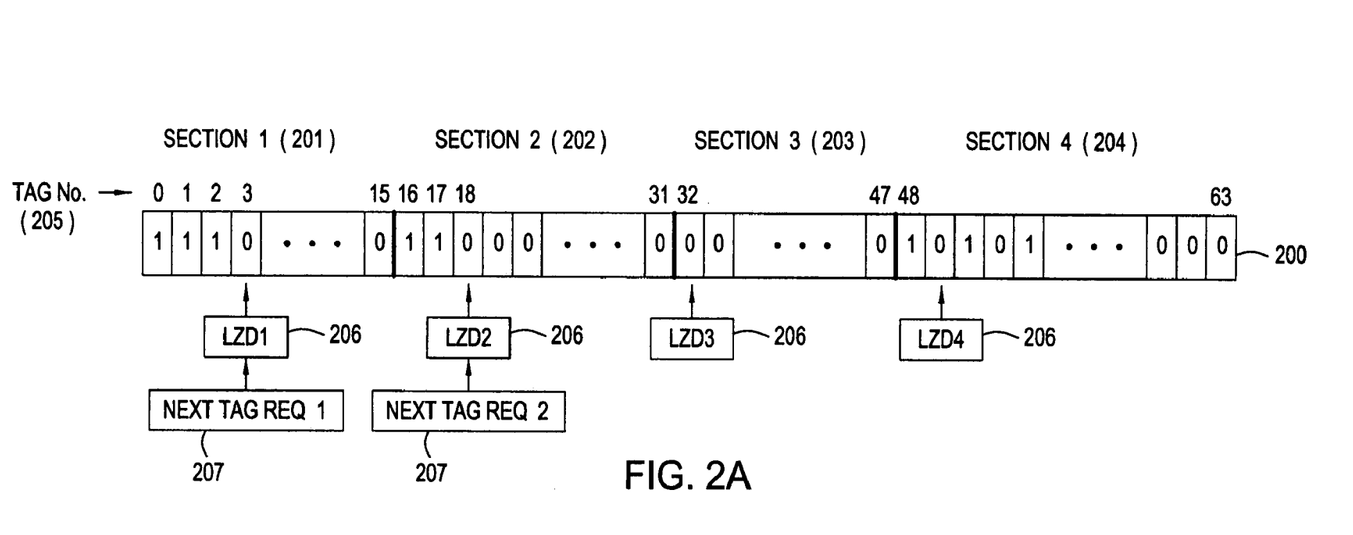
FIG. 2A-2C is an illustration of a tag pool according to an embodiment of the invention.

As illustrated, tag allocation logic 102 may contain a tag pool 112 from which tags may be allocated to the commands in input/output buffer 101. FIG. 2A illustrates an exemplary tag pool 112 according to one embodiment of the invention. Tag pool 112 may be a register, for example a 64 bit register 200, as illustrated in FIG. 2A. Each bit in register 200 may represent a tag. For example, tag numbers (205) from 0-63 are illustrated. Furthermore, tag pool 112 may be divided into a predetermined number of sections, each section comprising a plurality of tags. For example, in FIG. 2A, register 200 is divided into 4 sections 201-204, each section containing 16 tags. One skilled in the art will recognize however that the tag pool may be divided into any number of sections.

Each tag may be set to either logic 1 or logic 0 to indicate whether the tag number is being utilized. In FIG. 2A, a logic 1 may indicate that the tag number is already allocated to a command in the pipeline and logic 0 may indicate that the tag number is available for allocation. In section one 201, for example, logic 1's are stored for tag numbers 0, 1, and 2 to indicate that the respective tag numbers are assigned to commands in the pipeline, while logic 0's are stored in tags 3-15 to indicate that those tags are available. One skilled in the art will recognize that negative logic may also be used with logic 0 indicating that the tag number is taken and logic 1 indicating an available tag In some embodiments a leading zero detector 206 for each section of the tag pool may be utilized to indicate the next available tag in the section. The leading zero detector may identify the lowest tag number in a section with logic 0, indicating an available tag. For example, in FIG. 2A, the leading zero detector LZD1 for section 1 may indicate the first available tag for tags 0-15, the leading zero detector LZD2 for section 2 may indicate the first available tag for tags 16-31, and so on. As an illustration, in FIG. 2A leading zero detector LZD1 points to tag 3, LZD2 points to tag 18, LZD3 points to tag 32, and LZD4 points to tag 49.

Furthermore, each requester may have a next available tag pointer 207 identifying a potential next tag. The tag pointer may not be limited to a particular section, but may point to an available tag in any section. When a tag request is received the tag pointed to by the tag pointer may be provided to the requester from a first section. After the tag is allocated to the receiver, the next available tag pointer 207 may dynamically select a second section with an available tag. For example, a leading zero detector in the second section may identify the lowest numbered tag available to which the next available tag pointer may be set.

If a section with available tags is not found, the command may be stalled until tags become available. For example, all tags in a section may be allocated, and therefore no more tags may be available in the section. A section full indicator for the section may indicate that no more tags may be allocated from the section. Therefore, dynamic allocation may involve determining whether a section has tags available for allocation by examining the section full indicators for each section.

If a tag request is received from the same requester in a subsequent clock cycle, a tag may be provided to the requester from the second section. Alternating between sections for different clock frequencies may be done, for example, to allow the update of the first section from the first tag allocation. While the update for the first tag allocation from the first section is being completed a second tag may be allocated from the second section to the same requester, thereby improving performance.

Figure 2B:
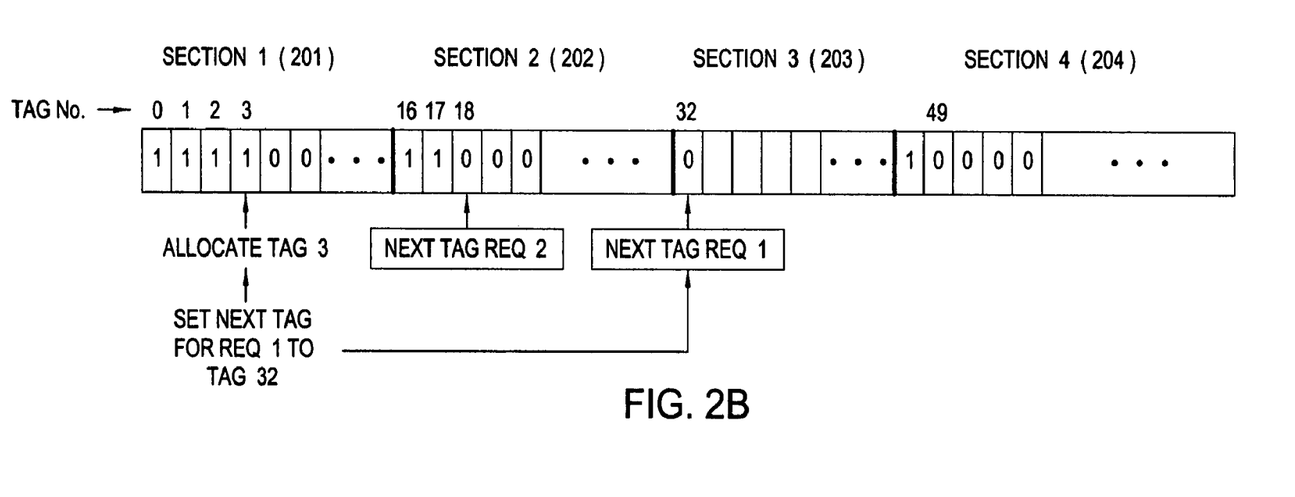

FIG. 2B illustrates the setting of the next available tag pointer for requester 1. For example, referring back to FIG. 2A, the next available tag pointer for requester 1 points to tag 3 in section 1. If a tag is requested by requester 1 in a first clock cycle, tag 3 from section 1 may be allocated to requester 1 in the first clock cycle. The next potential tag for requester 1 may be identified by dynamically selecting a next available section. For example, section 3 may be dynamically selected and the next tag available tag pointer for requester 1 may point to the lowest numbered tag 32 in section 3 in this example, as illustrated in FIG. 2B.

Figure 2C:
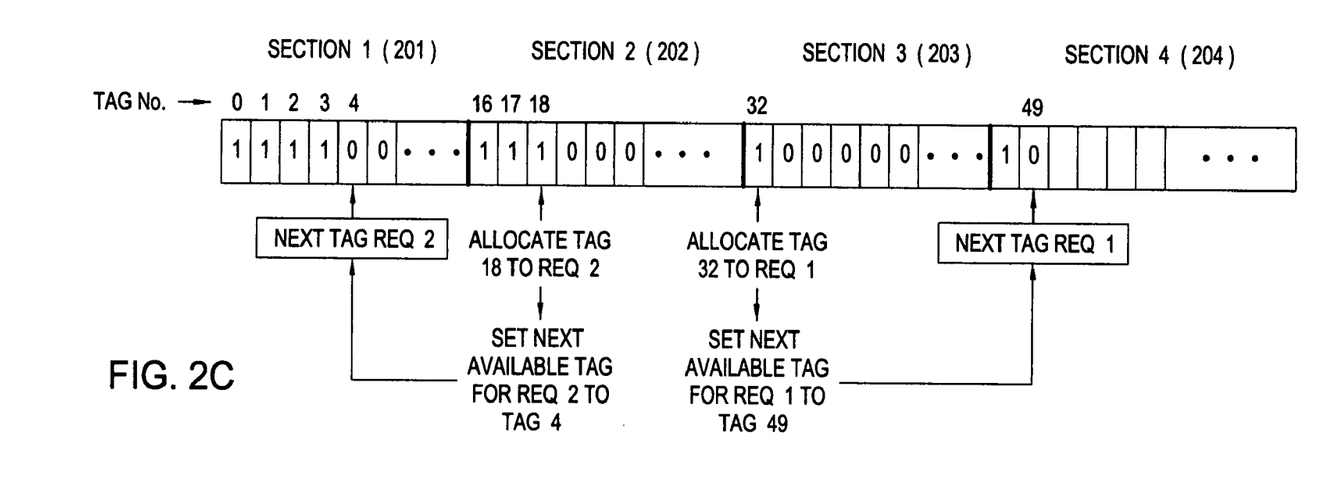

In a subsequent clock cycle, a tag request from requester 1 may be received again and tag 32 may be provided to requester 1 in the clock cycle. As illustrated in FIG. 2C, section 1 may be updated to reflect the first tag allocation to requester 1 by setting tag 32 to logic 1. As illustrated in FIG. 2B, the bit for tag 3 is toggled to logic 1 to indicate tag allocation.

In some embodiments of the invention multiple requesters may request tags in the same clock cycle. For example, requesters 1 and 2 may request tags in the same clock cycle. Because each section may provide a tag in each clock cycle, multiple tag allocation to multiple requesters per clock cycle may be possible.

FIG. 2C illustrates tag allocation for multiple requesters in the same clock cycle. For example, both requester 1 and requester 2 may request a tag. Because a tag may be allocated by each available section, tags may be provided to both requesters. For example, referring back to FIG. 2B, the next available tag pointer for requester 1 points to tag 32 in section 3, and the next available tag pointer for requester 2 points to tag 18 in section 2.

If a tag request is received from both requester 1 and requester 2, tag 32 may be provided to requester 1 and tag 18 may be provided to requester 2 in the same clock cycle. Sections 2 and 3 may be updated to reflect the allocation of tags 18 and 32 respectively, as illustrated in FIG. 2C. As illustrated in FIG. 2C, the next available tag pointer for requester 1 and 2 may be dynamically allocated to a next available section. For example, the next available tag pointer for requester 1 may point to the lowest numbered tag 4 in section 1 and the next available tag pointer for requester 2 may point to tag 49 in section 4.

Figure 3:
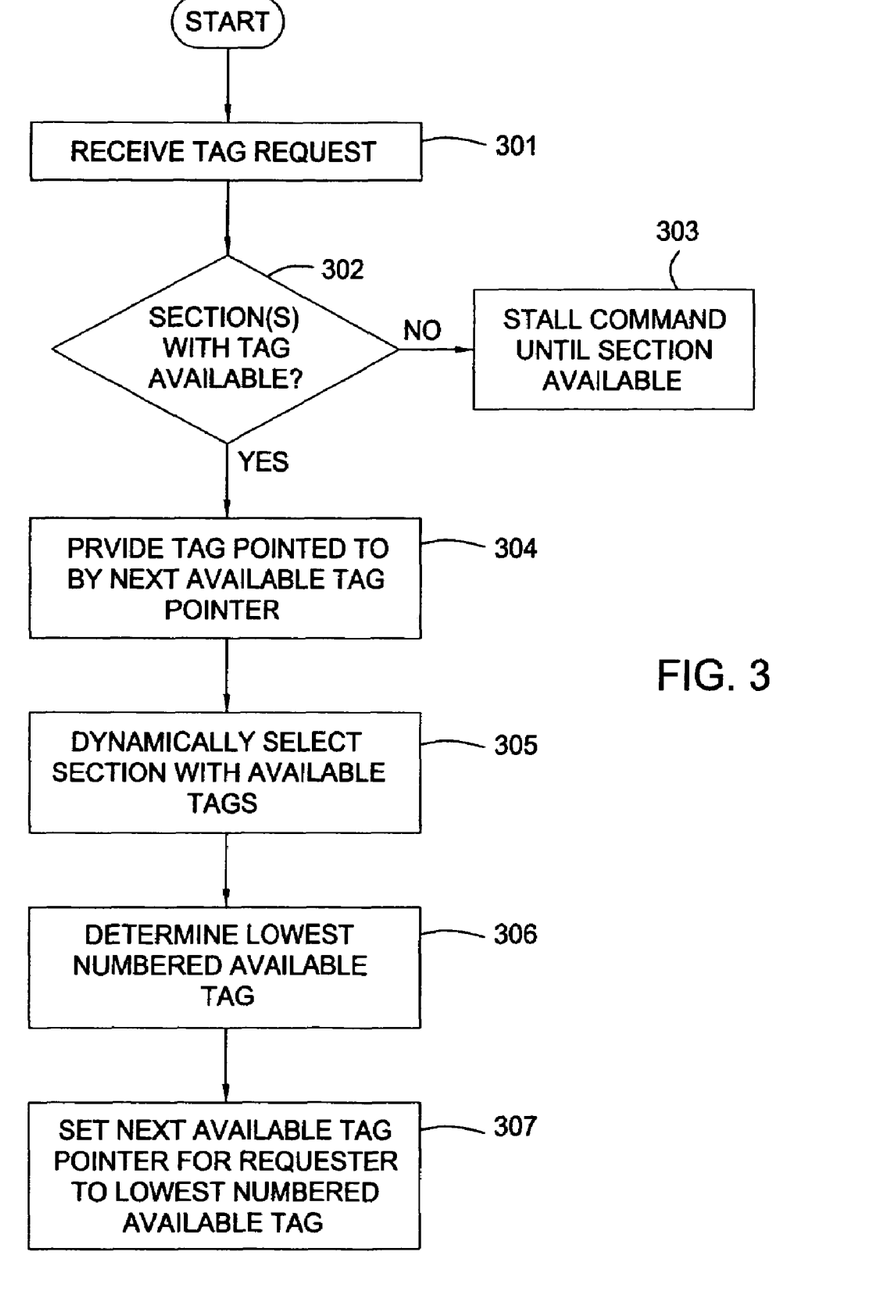
FIG. 3 is a flow diagram of exemplary operations performed by the tag allocation logic to retrieve a tag from a section associated with a requester.

FIG. 3 is a flow diagram of exemplary operations performed by the tag allocation logic to select potential tags for a particular requester. The operations begin in step 301 by receiving a tag request from a particular requester such as requester 1. In step 302, the tag allocation logic may determine whether there are any sections with unallocated tags available. If no sections are available for tag allocation, in step 304, the requester may be stalled until a section becomes available. For example, the requester may stall until the processing of one or more commands in the pipeline completes. A clear signal may be generated to clear the tag number allocated to the completed command. The cleared tag number may then be provided to the requester.

If sections are available for tag allocation, in step 303, the tag allocation logic may provide the tag pointed to by the next available tag pointer for the requester. In step 305, the tag allocation logic may dynamically select an available section. In step 306, the lowest numbered tag available may be determined in the available section. For example, in some embodiments a leading zero detector may determine the lowest numbered available tag in the dynamically selected section. In step 307, the next available tag pointer for the requester may be set to the lowest numbered available tag in the dynamically selected section.

Tag Allocation for Multiple Requesters in the Same Section

In some embodiments, the next available tag pointer for multiple requesters may point to an available tag in the same section. For example, if the tags in all but one section are allocated, the next available tag pointers for all requesters may point to the same section with the available tags. Because each section may provide only 1 tag per clock cycle, only one of the requesters may receive a tag from the section. Determination of which requester receives the tag may depend on a relative priority between the requesters. For example, if requesters 1 and 3 request a tag in the same clock cycle, and requester 1 has a higher priority than requester 3, requester 1 may receive the tag.

Figure 4A:
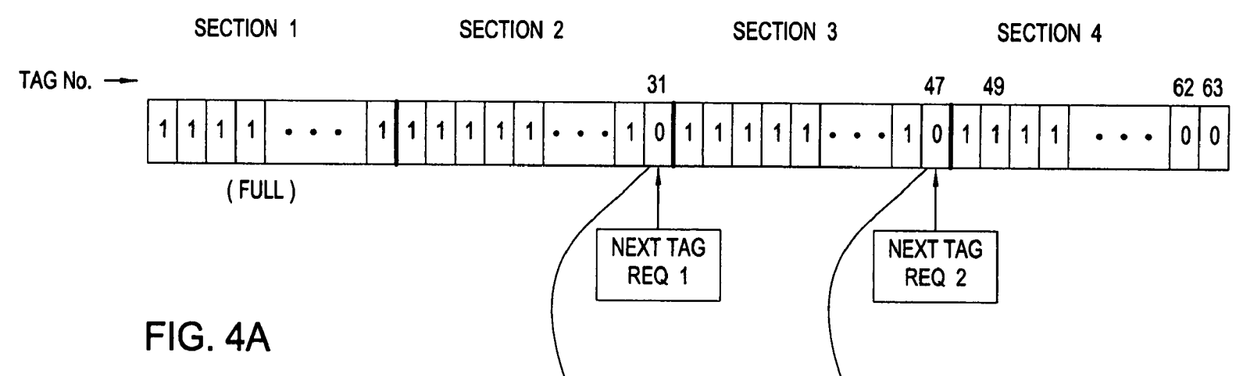
FIG. 4A-4C is another illustration of a tag pool according to an embodiment of the invention.
Figure 4B:
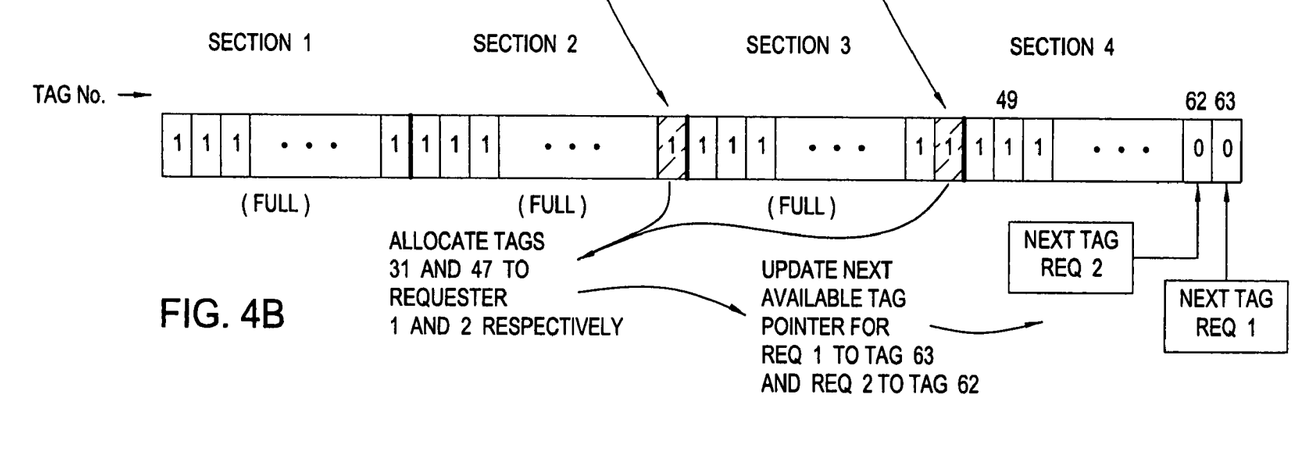

FIGS. 4A and 4B illustrate tag allocation for multiple requesters to the same section. As illustrated in FIG. 4A, no tags are available in section 1, and only 1 tag is available in each of sections 2, 3 and 4. Next available tag pointers for requesters 1 and 2 point to the available tag(s) in section 2 and 3 respectively. If, in a first clock cycle, requesters 1 and 2 request tags, the tags in sections 2 and 3 may be allocated to the requesters. The next available tag pointers for both requesters may then point to the available tags in section 4, as illustrated in FIG. 4B. In some instances, if only one tag is available, the next available tag pointer for both requesters may point to the same tag.

Figure 4C:
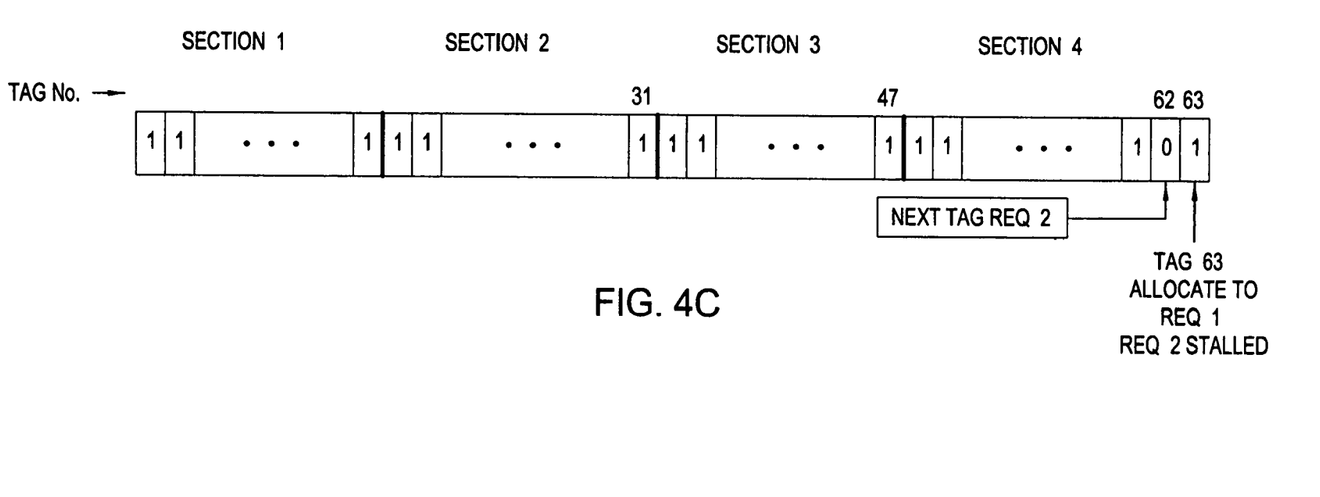

If, in a second clock cycle, a tag request is received from both requesters 1 and 2, a tag from section 4 may be provided to only one of the requesters, based on a priority of the requester. For example, the requester with the highest priority may receive the tag. FIG. 4C illustrates allocation of tag 63 to requester 1, the requester with the higher priority. As illustrated tag 63 is allocated to requester 1 while the request from requester 2 is stalled.

Figure 5:
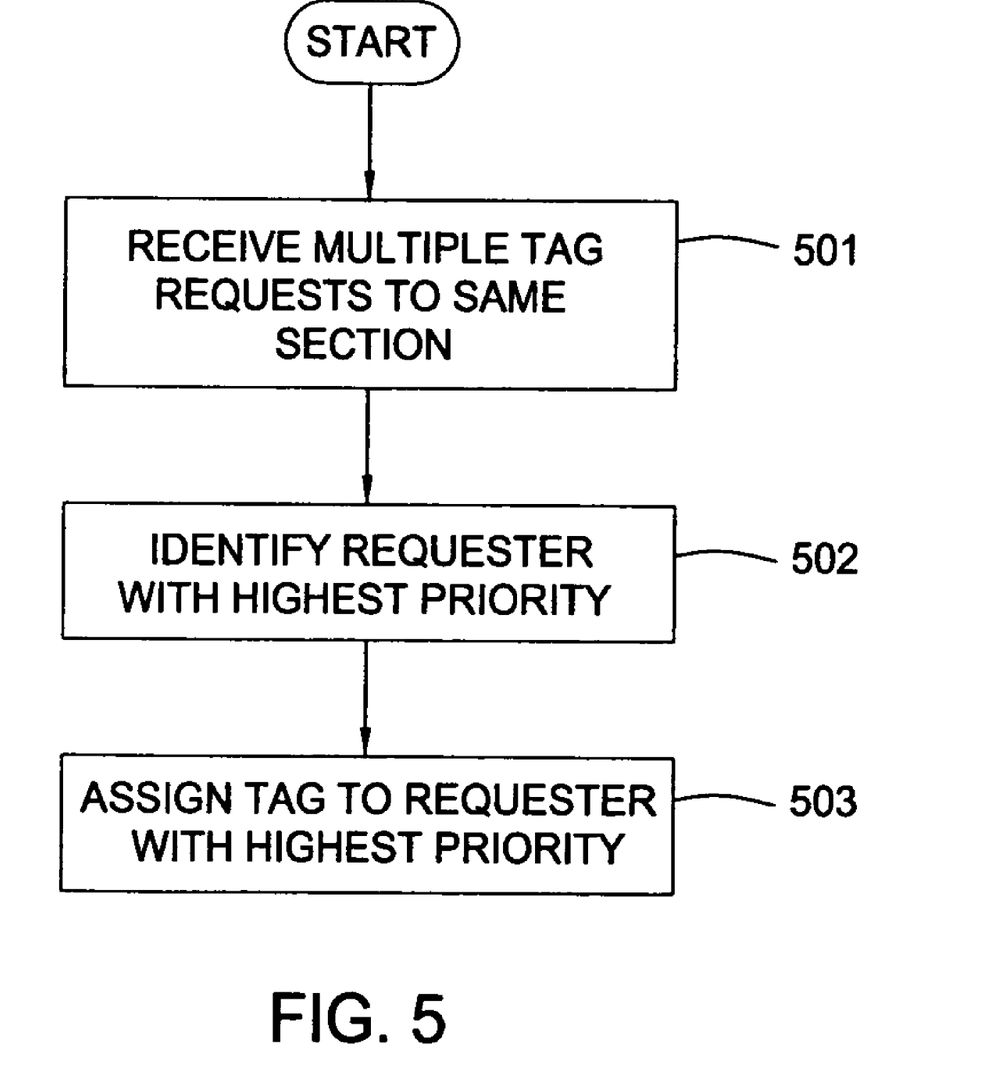
FIG. 5 is a flow diagram of exemplary operations performed by the tag allocation logic according to an embodiment of the invention.

FIG. 5 is a flow diagram of exemplary operations performed by the tag allocation logic to allocate a tag to a requester among multiple requesters to a section in the tag pool. The operations begin in step 501 by receiving multiple requests for a tag wherein the multiple requesters are associated with the same section in the tag pool. In step 502, the tag allocation logic may determine the requester with the highest priority. The requester with the highest priority may receive the tag in step 503. The requesters not receiving the tag may stall until a tag becomes available. For example, requesters not receiving tags may stall until the processing of one or more commands in the pipeline completes. A clear signal may be generated to clear the tag number allocated to the completed command. The cleared tag number may then be provided to a stalled requester.

CONCLUSION

By dividing a tag pool into multiple sections, each section providing a tag to a requester associated with the section in each clock cycle, embodiments of the present invention allow multiple tags to be allocated to multiple requesters in the same clock cycle, thereby increasing efficiency and improving performance.

While the foregoing is directed to embodiments of the present invention, other and further embodiments of the invention may be devised without departing from the basic scope thereof, and the scope thereof is determined by the claims that follow.

What is claimed is:

1. A computer-implemented method for allocating tags from a tag pool to multiple requesters, comprising:
   receiving requests for tags from the multiple requesters, wherein each tag, when provided to a requester, enables processing of a command received by a central processing unit, wherein each of the multiple requesters are associated with an available section from a predetermined number of sections of the tag pool, wherein each of the predetermined number of sections comprise a plurality of tags, and wherein each available section comprises at least one available tag;
   for each available section, assigning a predetermined tag from the section to a requester associated with the section; and
   for each requester receiving a tag:
      dynamically selecting a next available section, wherein the next available section contains at least one available tag; and
      setting a next available tag pointer to an available tag in the next available section.

2. The method of claim 1, wherein:
   multiple requesters are allowed to be associated with the same available section; and
   wherein each requester has a predefined priority.

3. The method of claim 2, further comprising if one or more requests are received from the one or more of the multiple requesters associated with the same section, allocating the tag to the requester with the highest priority.

4. The method of claim 1, wherein setting the next available tag pointer comprises determining the lowest numbered available tag in the next available section.

* * * * *